United States Patent [19]

Vankerckhoven et al.

[11] Patent Number: 4,765,858

[45] Date of Patent: Aug. 23, 1988

[54] PROCESS OF APPLYING A REACTING TRANSFER COATING FOR DECORATING LAMINATES

[75] Inventors: Henk F. E. Vankerckhoven, Rijmenam; Eric H. C. DeKoster, Bornem, both of Belgium

[73] Assignee: Scott Continental, N.V., Duffel, Belgium

[21] Appl. No.: 13,312

[22] Filed: Feb. 11, 1987

[51] Int. Cl.[4] .................... B44C 1/16; B32B 31/00; B32B 27/08

[52] U.S. Cl. ................................ 156/235; 156/240; 156/241; 428/502

[58] Field of Search ............... 156/230, 239, 241, 247, 156/249, 240, 235, 344; 428/171, 203, 211, 502, 200, 202, 349, 352; 427/150, 151

[56] References Cited

U.S. PATENT DOCUMENTS

| | | | |
|---|---|---|---|
| Re. 28,682 | 1/1976 | Hoey | 428/211 |
| 3,401,070 | 9/1968 | Brown | 156/230 |
| 3,551,241 | 12/1970 | Heeb et al. | 156/230 |
| 3,616,021 | 10/1971 | Valerius | 156/249 |
| 3,677,879 | 7/1972 | Oliver | |
| 3,990,932 | 11/1976 | Dupire | 156/230 |
| 4,132,822 | 1/1979 | Wismer | 156/230 |
| 4,311,748 | 1/1982 | Casey et al. | 428/211 |
| 4,311,757 | 1/1982 | Raghava et al. | 428/211 |
| 4,311,804 | 1/1982 | Raghava et al. | 428/211 |
| 4,315,790 | 2/1982 | Rattee et al. | 156/234 |
| 4,351,871 | 9/1982 | Lewis et al. | 428/197 |
| 4,374,886 | 2/1983 | Raghava et al. | 428/211 |

FOREIGN PATENT DOCUMENTS 936762 11/1973 Canada .
3422965 2/1987 Fed. Rep. of Germany .

*Primary Examiner*—Michael Ball
*Assistant Examiner*—Louis Falasco
*Attorney, Agent, or Firm*—R. Duke Vickrey; John W. Kane, Jr.; Francis M. DiBiase

[57] ABSTRACT

A transferable film composition coated on a temporary support is used in the manufacture of heat and pressure consolidated laminates to produce laminates of improved surface strength and functional properties. The film is composed of polyvinyl butyral resin and melamine resin which reacts with a resin in the laminates. Additives may be included in the film composition for functional purposes and appearance.

3 Claims, No Drawings

PROCESS OF APPLYING A REACTING TRANSFER COATING FOR DECORATING LAMINATES

TECHNICAL FIELD

The present invention relates to polymeric film compositions that are prepared on substrates having release properties. These temporarily supported films find use in the manufacture of decorative laminates wherein the laminate components are consolidated under heat and pressure and the polymeric film transfers to the surface of the laminate.

BACKGROUND ART

Heat and pressure consolidated decorative laminates have been produced commercially for a number of years, and have found widespread acceptance as mar-resistant surfaces for wallcoverings, paneling, tabletops, countertops, and the like. These laminates contain a number of laminae that are consolidated to form a unitary structure carrying a surface decoration which can range from something as simple as a solid color to something as complex as an embossed simulated wood grain finish.

Although the methods of preparing such laminates and the number and types of laminae can vary widely, the procedure for preparing such laminates generally involves the consolidation of one or more sheets of core stock, depending primarily on the ultimate thickness desired, in combination with a decorative or print sheet and a top coat or overlay. The core stock usually comprises an unbleached kraft paper which has been impregnated with a relatively inexpensive thermosetting resin, such as a phenolic resin, which is easily cross-linked upon the application of pressure and heat. In order to prevent sticking of the laminate to the press platens specially treated caulstock or a release medium such as a paper or foil with a release coating surface are used between the platens and the laminate.

The decorative or print sheet has more stringent requirements than the core stock. It is usually pigment filled, must be capable of being impregnated with a noble thermosetting resin cross-linkable upon the application of heat and pressure, but exhibiting no color deterioration upon the application of such heat and pressure, and it must now allow any strike-through or bleeding of the resin used in the core stock. In many instances, the decorative or print sheet must also be capable of being printed with a design, such as simulated wood grain, which survives the consolidation step intact. Two of the most common noble thermosetting resins used to impregnate the decorative or print sheet are urea-formaldehyde resin condensates and melamine-formaldehyde resin condensates. Other resins such as polyester resins have also been so employed.

In most instances an overlay sheet is superimposed over the decorative or print sheet prior to consolidation of the laminae. The overlay sheet is generally a thin, high-quality, alphacellulose paper which is also impregnated with a noble thermosetting resin, usually the same type in the decorative or print sheet. The overlay sheet is usually transparentized during the consolidation step, thereby enabling the decoration and/or printing which is present on the decorative or print sheet to be readily seen in the finished laminate, yet imparting a greater degree of mar and abrasion resistance to the decorative laminate than would otherwise be obtained without such an overlay.

An alternative to using an overlay sheet is to employ a polymeric film between the decor sheet and the release medium. U.S. Pat. No. 3,616,021 discloses the use of a thermoplastic film in this manner. Films used in this manner are likely to be thermoplastic materials such as acrylics. Since the film is self-supporting it is necessarily thick and because of its rigid structure, the film is very brittle and handling of the film is difficult. Contamination of the film is also a problem since dust is picked up very easily by both sides of the film.

Another alternative to using an overlay sheet is to employ a film of noble thermosetting resin on a substrate having release properties. This approach provides compatibility between the resins in the film and the resin in the decorative sheet, but not a reaction between the resins of the film and the decorative sheet to produce a laminate with the improved surface properties of the invention.

DISCLOSURE OF THE INVENTION

The present invention is a process for preparing a decorative laminate comprising the steps of:
  (A) stacking together in an assembly
    (a) one or more resin impregnated core sheets,
    (b) a decorative fibrous sheet impregnated with a noble thermosetting resin, and
    (c) a releasing carrier surface coated with a film composition comprising polyvinyl butyral resin and melamine resin in contact with the decorative fibrous sheet;
  (B) applying heat and pressure to the assembly to result in
    (a) the film composition on the releasing carrier surface and the noble thermosetting resin of the decorative fibrous sheet reacting with each other and
    (b) the laminae being consolidated into a unitary structure; and
  (C) separating the releasing carrier surface from the unitary structure.

The invention is also the decorative laminate produced by the above described method.

The invention is also a transferable film composition on a releasing carrier surface capable of transferring to and reacting with noble thermosetting resin impregnants of decorative fibrous sheets in a heat and pressure laminating process, the film composition comprising of polyvinyl butyral resin and melamine resin.

The present invention provides decorative laminates with improved bond between the decorative fibrous sheets and the superimposed film surfacing compositions because of the reactivity between the two. It also can provide other desirable surface properties, such as weather resistance or decorative effects, without adversely affecting the bond properties.

The essential components of the film composition on the releasing carrier surface are thermosetting polyvinyl butyral resin and melamine resin. Polyvinyl butyral has the ability to thermoset into a hard durable film and also reacts with melamine resin. Polyvinyl butyral is a polyvinyl acetal prepared by reacting butyraldehyde with polyvinyl alcohol.

Although polyvinyl acetal resins normally are thermoplastic and soluble in a range of solvents, they may be cross-linked through heating with a trace of mineral acid as a catalyst. Cross-linking is thought to be caused by trans-acetalization, but may also involve more complex mechanisms such as a reaction between acetate or hydroxyl groups on adjacent chains. As a practical matter, cross-linking of the polyvinyl acetals is carried out by reaction with various thermosetting resins such as phenolics, epoxies, ureas, diisocyanates and melamines. The availability of the functional hydroxyl groups in vinyl acetals for condensations of this kind is an important consideration of this application. Incorporation of even a small amount of vinyl acetal resin into thermosetting compositions markedly improves toughness, flexibility and adhesion of the cured coating.

Vinyl acetal films by themselves are characterized by high resistance to aliphatic hydrocarbons, mineral, animal and vegetable oils (with the exception of castor and blown oils). They withstand strong alkalis but are subject to some attack by strong acids. However, when employed as components of cured coatings, their stability to acids as well as solvents and other chemicals is improved greatly.

The presence of hydroxyl groups in the acetal polymer molecule not only enables good wetting of most substrates, particularly important when applying the composition to a release coated temporary carrier, but also furnishes reactive sites for chemical combination with other thermosetting resins.

Thus, in the presence of an acidic catalyst such as p-toluenesulfonic acid, condensation reactions take place on heating among all of the reactive functional groups of the polyvinyl acetal of the transfer film, the melamine resin of the transfer film and the melamine resin of the decorative sheet (groups such as hydroxy, amine, methoxy and acetal) to produce a very strong, cross-linked matrix. The reaction product is particularly stable when the polyvinyl acetal resin of the present invention is employed, for this resin has a long carbon chain backbone that would not be present if only melamine-formaldehyde resins were used.

By including a melamine resin in the film composition, the benefits are further enhanced since the kinetics of the reaction are greatly improved due to the intimate mixing of the components. In addition to participating in the foregoing reactions, melamine resin improves the solvent resistance of the transfer film. It removes the film from the thermoplastic state, and the entire film becomes one that is basically thermoset. The mechanical properties of the film are also greatly improved. It should be noted that when melamine alone is used as a transfer film it is quite brittle and unmanageable.

BEST MODE FOR CARRYING OUT THE INVENTION

In a preferred form for practicing the invention, the polyvinyl acetal is dissolved in an appropriate solvent, such as mixture of toluene and methanol. Following this, melamine resin combined with the mixture. Cross-linking occurs as a natural reaction but can be hastened by use of a catalyst. The film composition is coated on a releasing carrier surface, such as a release paper, and on drying a transfer film of polyvinyl acetal and partially alkylated melamine resin is present as a clear transparent nonbrittle film.

In this condition the film is ready for the laminating process.

As described earlier an assembly is prepared of phenolic resin core sheets, and superimposed over this is a resin impregnated decorative sheet. Placed over the decorative sheet is the transfer film on the release sheet with the film facing the decorative sheet. Upon the application of heat and pressure in the laminating process the film composition is able to react chemically with the resin of the decorative sheet. In this way the transferred composition is bonded very tightly and irreversibly to the decorative sheet, and the advantages of the invention are a direct consequence of this strong bonding.

The reactive components of the transferable film composition can be described by the following general descriptions.

Polyvinyl Acetal Resin

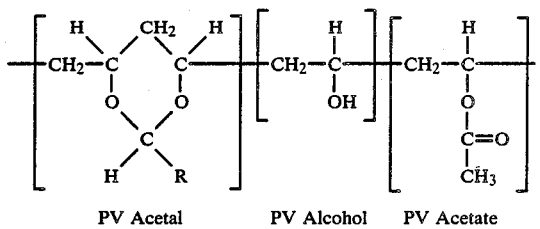

PV Acetal    PV Alcohol    PV Acetate wherein $R = C_3H_7$

While this resin is composed of three groups, it is the polyvinyl acetal and polyvinyl alcohol groups which are the most reactive. The polyvinyl acetate group is present as an unhydrolyzed residue from the parent polyvinyl acetate.

The melamine resin as used in the decorative sheet and the transfer film is represented by the following general structure:

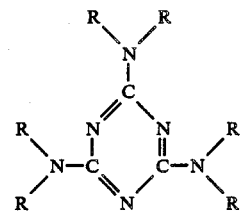

wherein R can be any combination of H, —CH$_2$OH or —CH$_2$—O—CH$_3$.

As stated earlier, in the presence of a catalyst, condensation reactions take place on heating between all of the reactive functional groups such as hydroxy, amine, methoxy and acetal of both the polyvinyl acetal and the melamine resin.

In the practice of the invention the polyvinyl acetal of the film composition will be polyvinyl butyral. The melamine resin in the film composition will be a melamine-formaldehyde condensation product. The film composition will be applied to the functional surface of a releasing carrier. There are a number of release papers on the market suitable for the releasing carrier. It is well known that they can be selected for the particular finish that they impart to the decorative laminate and also for the degree of release desired after the laminating operation. An example of a suitable release paper is described in U.S. Pat. No. 3,946,135.

The amounts of the various components used in the film composition of this invention are not narrowly critical, and can range, for example, from about 15 parts by weight (dry) to about 90 parts by weight (dry) of polyvinyl butyral per 100 parts by weight (dry) of coating, from about 10 parts by weight (dry) to about 85 parts by weight (dry) of melamine resin per 100 parts by weight (dry) of coating and at least about 0.3 parts by weight (dry) of acid catalyst per 100 parts by weight (dry) of coating.

The decorative sheet will be impregnated with a melamine resin that is the same as or similar to the melamine resin used in the transfer film composition. In the preparation of the decorative sheet, the melamine has preferably not been fully cured prior to consolidating the laminate.

As is well-known in the art, additives may be combined with the film composition to impart their particular properties to the finished laminate. These additives might be in the manner of those to affect the physical appearance of the finished laminate or those that might impart or improve the mechanical and chemical properties of the finished laminate.

The following example is illustrative of the invention.

| Example | Parts by Wgt. |
|---|---|
| Toluene | 80 |
| Methanol | 20 |
| Mowital B 30H (polyvinyl butyral manufactured by Hoechst Aktiengesellschaft) | 25 |
| Beetle resin 3735 (a 72% solution in isopropanol of methylated melamine resin manufactured by BIP Chemicals LTD) | 14 |
| para-toluene sulfonic acid (a catalyst) | 0.6 |
| Nacure 155 (dinonylnaphthalene disulfonic acid, manufactured by King Industries, as a 55% solution in isobutanol, a catalyst) | 0.5 |
| Irganox 1010 (an antioxidant manufactured by Ciba-Geigy) | 0.35 |

The polyvinyl butyral was dissolved in the toluene-methanol mixture under vigorous agitation. Following this, the melamine resin, the catalysts and the antioxidant were added. The solution was well-stirred and further diluted with a mixture of toluene and methanol in a ratio of 80 to 20, respectively, to attain the viscosity necessary for a homogeneous coating.

The coating was applied by fountain-doctor roll coater onto the surface of a silicone coated release paper. The coating was dried in a ventilated oven at 120° C.–140° C. for about 0.5 minutes and upon drying was present as a clear transparent nonbrittle film on the release paper.

A laminate assembly was then set up which was arranged with 3 core sheets impregnated with phenolic thermosetting resin on the bottom. Superimposed over the core sheets was a decorative fibrous sheet of alpha-cellulose paper impregnated with a thermosetting melamine-formaldehyde resin. The film composition on the release paper was placed over the decorative sheet with the film composition in face-to-face relationship with the decorative sheet. The entire assembly was placed in a laminating press where it was consolidated into a unitary structure at a temperature of 140° C. and a pressure of about 100 kg/cm². Upon removal from the press, the laminate was cooled and the release paper was stripped from the laminate.

There are a number of tests that can be performed on decorative laminates to determine how they will withstand certain conditions. Many of these are fully described and published by the National Electrical Manufacturers Association in their Standards Publication LD-3, 1985. Following is a brief description for some of these tests:

Boiling Water: A section of laminate is subjected to boiling water for a set period of time. The surface is later examined for whitening or a change in surface texture. Results of the examination are categorized as follows:
No effect: No changes on the surface of the laminate. There is no whitening and no change in surface texture.
Slight effect: There is a change in color or surface texture that is only visible when viewing the surface at certain angles or from certain directors.
Moderate effect: There is a change in color or surface texture visible at all angles and directions but it does not appreciably alter the original condition of the sample.
Severe effect: There is a change in color or surface texture which is obvious and markedly alters the original condition of the sample, e.g., cracks, crazing, blisters, discoloration, whitening or delamination.

In most cases, samples exhibiting no effect or slight effect are acceptable.

High Temperature Resistance: A section of laminate is subjected to heated wax (180° C.) for a set period of time. The surface is later examined for whitening or a change in surface texture. The specifications are the same as those categorized for the Boiling Water test.

Scratch Resistance: This is a measurement taken on Teledyne Taber Model 502 Shear/Scratch Tester. The force necessary for a needle to scratch the laminate surface is recorded in Newtons. A high value number indicates good scratch resistance, and a low value indicates poor resistance.

Resistance to Steam: This is a hot condensation test in which the laminate is used as a cover on a vessel containing constantly boiling water for a period of two hours. The surface is later examined for whitening or a change in surface texture. The specifications are the same as those categorized for the Boiling Water test.

Resistance to Chemicals: A sample of laminate is placed in a special holder which provides for a certain amount of the chemical under investigation to be in contact with the laminate for 16 hours. The exposed laminate surface is then compared to a reference unexposed laminate surface. The specifications are the same as those categorized for the Boiling Water test.

The laminate prepared in the Example was tested along with the only known commercial laminate which is of the type wherein an acrylic film sandwiched between a release medium and the decorative sheet is consolidated with the decorative sheet in the consolidation process.

The results summarized in the following table demonstrate the superior laminate of the invention.

| Test | Example | Known Commercial Laminate |
|---|---|---|
| Boiling Water | no effect | severe effect |
| High Temperature | no effect | severe effect |
| Scratch Resistance | 1.5 N | 0.5 N |
| Resistance to Steam | no effect | severe effect |
| Chemical Resistance | | |
| Acetone | no effect | severe effect |
| Ethanol | " | " |
| 1-Propanol | " | " |

-continued

| Test | Example | Known Commercial Laminate |
|---|---|---|
| Ethylacetate | " | " |
| Toluene | " | " |
| Dichloromethane | " | " |
| 10% HCl | moderate effect | no effect |
| 10% H$_2$SO$_4$ | no effect | " |
| 10% NaOH | " | " |
| 10% HNO$_3$ | " | " |
| 10% CH$_3$COOH | " | " |

What is claimed is:

1. In a process for preparing a decorative laminate comprising the steps of:
   (A) stacking together in an assembly
      (a) one or more resin impregnated core sheets,
      (b) a decorative fibrous sheet impregnated with a noble thermosetting resin, and
      (c) a releasing carrier surface coated with a film composition in contact with the decorative fibrous sheet;
   (B) applying heat and pressure to consolidate the assembly into a unitary structure; and
   (C) separating the releasing carrier surface from the unitary structure;
the improvement wherein said film composition comprises polyvinyl butyral resin and melamine resin which reacts with the noble thermosetting resin of the decorative fibrous sheet during assembly consolidation.

2. The process for preparing a decorative laminate according to claim 1, wherein the film composition coated on the releasing carrier surface further comprises at least one acid catalyst.

3. The process for preparing a decorative laminate according to claim 1, wherein the film composition coated on the releasing carrier surface further includes an antioxidant.

* * * * *